United States Patent
Wilcox

(10) Patent No.: US 10,444,526 B2
(45) Date of Patent: Oct. 15, 2019

(54) OPTICAL PULSE COMBINER COMPRISING DIFFRACTIVE OPTICAL ELEMENTS

(71) Applicant: Russell Wilcox, Berkeley, CA (US)

(72) Inventor: Russell Wilcox, Berkeley, CA (US)

(73) Assignee: The Regents of the University of California, Oakland, CA (US)

( * ) Notice: Subject to any disclaimer, the term of this patent is extended or adjusted under 35 U.S.C. 154(b) by 149 days.

(21) Appl. No.: 15/658,740

(22) Filed: Jul. 25, 2017

(65) Prior Publication Data

US 2018/0031851 A1    Feb. 1, 2018

Related U.S. Application Data

(60) Provisional application No. 62/369,373, filed on Aug. 1, 2016.

(51) Int. Cl.
| | |
|---|---|
| *G02B 27/10* | (2006.01) |
| *H01S 3/23* | (2006.01) |
| *G02B 5/18* | (2006.01) |
| *H01S 3/067* | (2006.01) |
| *H01S 3/13* | (2006.01) |

(52) U.S. Cl.
CPC ....... *G02B 27/1086* (2013.01); *G02B 5/1861* (2013.01); *H01S 3/2383* (2013.01); *H01S 3/067* (2013.01); *H01S 3/1307* (2013.01)

(58) Field of Classification Search
USPC ......... 359/55, 566, 569, 570, 572, 618, 625, 359/627, 629
See application file for complete search history.

(56) References Cited

U.S. PATENT DOCUMENTS

| | | |
|---|---|---|
| 5,293,389 A | 3/1994 | Yano |
| 6,314,119 B1 | 11/2001 | Morton |
| 7,199,924 B1 | 4/2007 | Brown et al. |
| 7,233,442 B1 | 6/2007 | Brown et al. |
| 7,675,673 B2 | 3/2010 | Mueller |
| 7,912,100 B2 | 3/2011 | Shah |
| 8,049,966 B2 | 11/2011 | Chann |
| 8,279,903 B2 | 10/2012 | Shah |
| 8,531,772 B2 | 9/2013 | Chann |

(Continued)

FOREIGN PATENT DOCUMENTS

| | | | | |
|---|---|---|---|---|
| WO | WO-2015181130 A1 | * | 12/2015 | ............... G02B 6/00 |
| WO | WO-2015181137 A1 | * | 12/2015 | ......... G02B 27/1086 |
| WO | WO 2016/018538 | | 2/2016 | |

OTHER PUBLICATIONS

T. Y. Fan, "Laser beam combining for high-power, high-radiance sources," IEEE JSTQE 11, 567 (2005).

(Continued)

*Primary Examiner* — Robert E. Tallman

(57) ABSTRACT

This disclosure provides systems, methods, and apparatus related to optical systems. In one aspect, an optical system includes a plurality of optical sources, a first diffractive optical element, and a second diffractive optical element. The plurality of optical sources generates a plurality of pulsed beams that is less than about 1 picosecond in duration. The first diffractive optical element receives and diffracts the plurality of pulsed beams. The second diffractive optical element receives the diffracted plurality of pulsed beams and generates a combined pulsed beam.

20 Claims, 12 Drawing Sheets

(56) References Cited

U.S. PATENT DOCUMENTS

| | | |
|---|---|---|
| 9,134,538 B1 | 9/2015 | Augst |
| 2011/0280581 A1 * | 11/2011 | Chann |
| 2017/0199390 A1 * | 7/2017 | Bourderionnet ... G02B 27/1086 |
| 2017/0201063 A1 * | 7/2017 | Bourderionnet ......... G02B 6/00 |

OTHER PUBLICATIONS

M. Kienel et al., "12 mJ kW-class ultrafast fiber laser system using multidimensional coherent pulse addition," Opt. Lett. 41, 3343 (2016).
Thielen, P. A. et al., "Two-dimensional diffractive coherent combining of 15 fiber amplifiers into a 600 W beam," Optics Letters vol. 37, Issue 18, pp. 3741-3743 (2012).
Redmond, S. M. et al., "Diffractive coherent combining of a 2.5 kW fiber laser array into a 1.9 kW Gaussian beam," Optics Letters vol. 37, Issue 14, pp. 2832-2834 (2012).
Augst, S. J., et al., "Coherent and Spectral Beam Combining of Fiber Lasers," Proc. SPIE 8237, Fiber Lasers IX: Technology, Systems, and Applications, 823704 (Feb. 13, 2012).
Wilcox, R., "A New Concept for High Average Power Ultrafast Lasers," Laboratory Directed Research and Development Program FY 2015, LBNL-103E, Jun. 2016.
R. Wilcox et al., "Femtosecond Beam Combination Using Diffractive Optic Pairs," in Conference on Lasers and Electro-Optics, (Optical Society of America, 2017), paper SM4I.2.
A. Klenke et al., "530 W, 1.3 mJ, four-channel coherently combined femtosecond fiber chirped-pulse amplification system," Opt. Lett. 38, 2283-2285 (2013).

\* cited by examiner

OPTICAL PULSE COMBINER COMPRISING DIFFRACTIVE OPTICAL ELEMENTS

RELATED APPLICATIONS

This application claims priority to U.S. Provisional Patent Application Ser. No. 62/369,373, filed Aug. 1, 2016, which is herein incorporated by reference.

STATEMENT OF GOVERNMENT SUPPORT

This invention was made with government support under Contract No. DE-AC02-05CH11231 awarded by the U.S. Department of Energy. The government has certain rights in this invention.

TECHNICAL FIELD

This disclosure relates generally to lasers and more particularly to a combiner for fast optical pulses.

BACKGROUND

A fiber laser is a laser in which the active gain medium is an optical fiber doped with rare-earth elements such as erbium, ytterbium, neodymium, dysprosium, praseodymium, thulium, and holmium. Fiber lasers can be used as high power, high repetition rate, ultrafast laser sources. Fiber lasers have advantages in efficiency, beam quality, and average power capability, but are limited in peak power due to nonlinear and damage effects.

Combining the outputs of many lasers to scale the energy output has been accomplished with continuous wave (CW) lasers using beam combination based on a diffractive optical beam splitter. This technique, however, cannot be used with ultrashort (e.g., ~100 femtosecond (fs)) pulses due to angular dispersion and pulse front tilt.

SUMMARY

Embodiments described herein allow multiple ultrafast (e.g., less than 1 picosecond) laser beams to be combined to increase the energy available from a laser. The embodiments described herein are particularly applicable to fiber lasers, as fiber lasers are intrinsically limited in energy. Currently there are other, more cumbersome methods to combine laser beams that use polarizing or non-polarizing beam splitters, which can only combine beams two at a time, requiring "trees" of them to combine many beams. Embodiments described herein allow one to combine tens or hundreds of beams at a time, which will be needed when fiber lasers are used to produce Joules of energy from tens or hundreds of lasers.

One innovative aspect of the subject matter described in this disclosure can be implemented in an optical system including a plurality of optical sources, a first diffractive optical element, and a second diffractive optical element. The plurality of optical sources generates a plurality of pulsed beams that is less than about 1 picosecond in duration. The first diffractive optical element receives and diffracts the plurality of pulsed beams. The second diffractive optical element receives the diffracted plurality of pulsed beams and generates a combined pulsed beam.

Another innovative aspect of the subject matter described in this disclosure can be implemented in an optical system including a plurality of optical sources, a grating array, and a beam splitter. The plurality of optical sources generates a plurality of pulsed beams that is less than about 1 picosecond in duration. The grating array includes a plurality of individual blazed gratings with a number of the plurality of individual blazed gratings being equal to a number of the plurality of pulsed beams. The grating array receives and diffracts the plurality of pulsed beams. The beam splitter receives the diffracted plurality of pulsed beams. The beam splitter is oriented to combine the diffracted plurality of pulsed beams to generate a combined pulsed beam.

Another innovative aspect of the subject matter described in this disclosure can be implemented in a method including generating a plurality of pulsed beams. Each pulsed beam is substantially parallel to other pulsed beams. Each pulsed beam is less than about 1 picosecond in duration. The plurality of pulsed beams is diffracted with a first diffractive optical element so that the plurality of pulsed beams converges a distance from the first diffractive optical element. The plurality of pulsed beams is received at the distance from the first diffractive optical element at a second diffractive optical element. The second diffractive optical element combines the plurality of pulsed beams to generate a combined pulsed beam.

Details of one or more embodiments of the subject matter described in this specification are set forth in the accompanying drawings and the description below. Other features, aspects, and advantages will become apparent from the description, the drawings, and the claims. Note that the relative dimensions of the following figures may not be drawn to scale.

DETAILED DESCRIPTION

Figure 1:
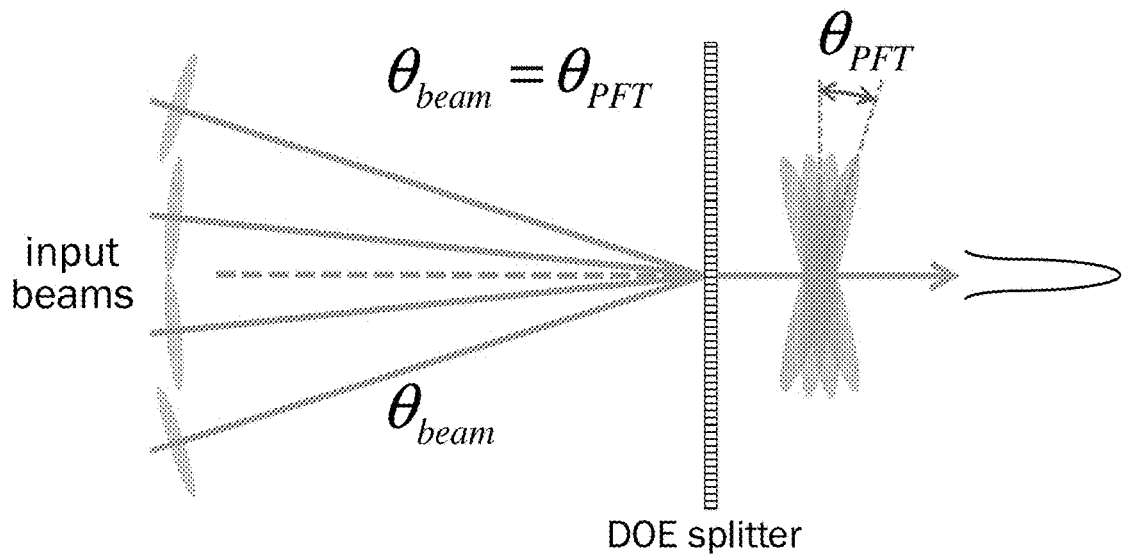
FIG. 1 shows an example of a cross-sectional schematic illustration of a beam combiner and the effect of pulse front tilt.

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise.

The terms "about" or "approximate" and the like are synonymous and are used to indicate that the value modified by the term has an understood range associated with it, where the range can be ±20%, ±15%, ±10%, ±5%, or ±1%. The term "substantially" is used to indicate that a value is close to a targeted value, where close can mean, for example, the value is within 80% of the targeted value, within 90% of the targeted value, within 95% of the targeted value, or within 99% of the targeted value.

Fiber lasers have good efficiency and beam quality, but have small apertures that limit the extractable power and energy. Continuous wave (CW) fiber lasers have been combined with high efficiency using diffractive optical elements. Diffractive optical elements are more easily implemented and more readily scalable compared with other beam combining schemes.

The pulsed operation of a laser refers to any laser not classified as a continuous wave laser. The optical power of a pulse laser appears in pulses of some duration at some repetition rate. Ultrafast pulse fiber lasers cannot be combined using a single diffractive optic (e.g., as continuous wave fiber lasers can be) due to the inefficiency which would result from pulse front tilt. Pulse front tilt is a phenomenon in which the arrival time of a pulse is not uniform across the beam profile. For example, the top of the pulse may arrive at flat surface perpendicular to the beam propagation direction before the bottom of the pulse. Pulse front tilt is related to angular dispersion, which is the dependence of the wave front orientation on the optical frequency. In combining beams of ultrafast pulse fiber lasers with a single diffractive optic, each beam would experience a different front tilt, resulting in a failure of the beams to interfere constructively.

Figure 2:
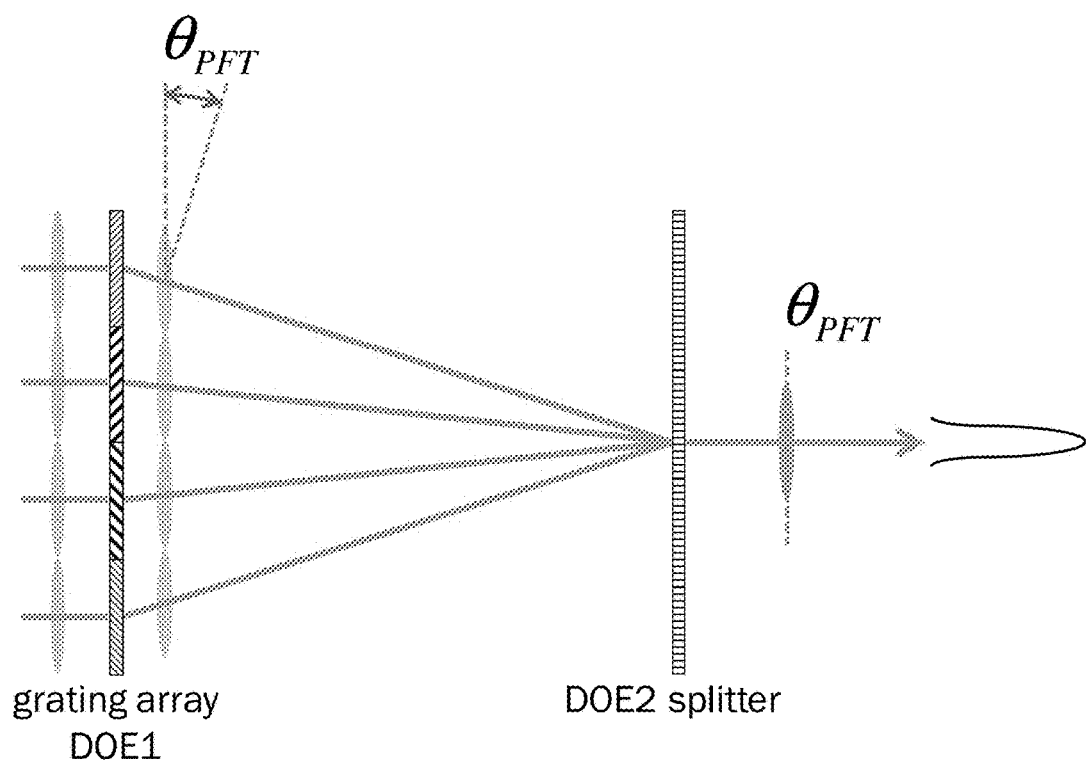
FIG. 2 shows an example of a cross-sectional schematic illustration of a beam combiner that reduces or eliminates the effect of pulse front tilt.

FIG. 1 shows an example of a cross-sectional schematic illustration of a beam combiner and the effect of pulse front tilt. As shown in FIGS. 1 and 2, the pulse front tilt of a pulsed beam is the angle of a pulsed beam with respect to its propagation direction. The beam combiner shown in FIG. 1 comprises a single diffractive optical element (DOE), a beam splitter. The beam splitter is operated in reverse as a beam combiner. For example, with pulsed beams having a 1 micron wavelength, a 100 femtosecond duration, and being diffracted by the diffractive optical element at a diffraction angle of up to 10 milliraidians (mils), the pulse front tilt is about 33 femtoseconds per millimeter (fs/mm). This would lead to a loss of up to 20% to 30% in the combined pulse.

Described herein is an optical system that can cancel the pulse front tilt in pulsed beam, enabling the use of diffractive beam combiners with ultrashort pulses. The optical system can also address the problem of angular dispersion. In some embodiments, the optical system includes two elements that act like a grating pair for each beam. With two gratings, the residual dispersions will be temporal dispersion and spatial chirp, which can be rendered negligible by specified parameters. Using two elements and a two-dimensional arrays of beams, many beams can be combined while maintaining high efficiency and power handling capability.

FIG. 2 shows an example of a cross-sectional schematic illustration of a beam combiner that reduces or eliminates the effect of pulse front tilt. The beam combiner shown in FIG. 2 comprises two diffractive optical elements, a grating array (DOE1) and a beam splitter (DOE2). With the beam combiner shown in FIG. 2, the grating array (DOE1) introduces pulse front tilt in pulsed beams, and the beam splitter (DOE2) removes the pulse front tilt in the pulsed beams. For example, with pulsed beams having a 1 micron wavelength, a 100 femtosecond duration, and being diffracted by the diffractive optical elements at a diffraction angle of 10 milliradians or less, the additional loss compared with the CW case is <1%.

Figure 3:
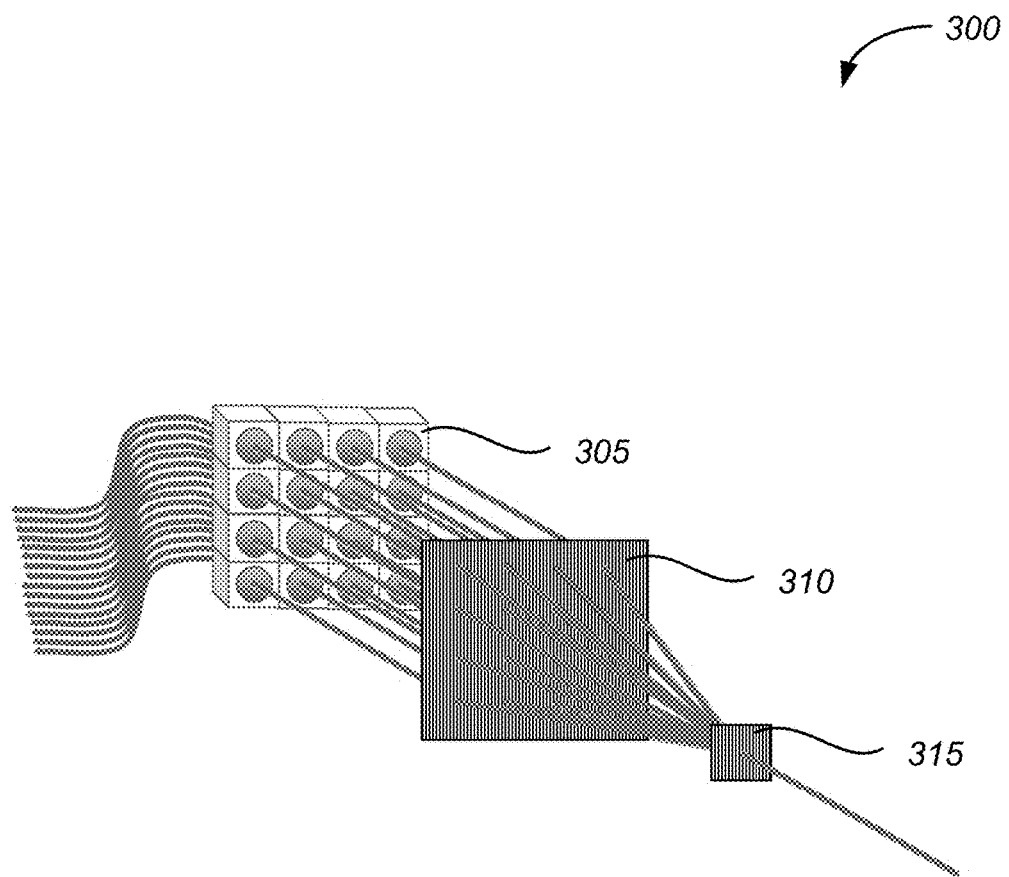
FIG. 3 shows an example of a schematic illustration of an optical system.

FIG. 3 shows an example of a schematic illustration of an optical system. The optical system 300 shown in FIG. 3 includes a plurality of optical sources 305, a first diffractive optical element 310, and a second diffractive optical element 315. In operation, each optical source of the plurality of optical sources 305 sources generates a pulsed beam that is less than about 1 picosecond (ps) in duration. In some embodiments, each pulsed beam of the plurality of pulsed beams has a wavelength of about 1 micron. The first diffractive optical element 310 receives and diffracts the plurality of pulsed beams. The second diffractive optical element 315 receives the diffracted plurality of pulsed beams and coherently combines the plurality of pulsed beams to generate a combined pulsed beam.

In some embodiments, the plurality of optical sources 305 comprises fiber lasers. The optical sources may also comprise other types of lasers. In some embodiments, the plurality of pulsed beams is about 10 femtoseconds to 500 femtoseconds, about 30 femtoseconds to 100 femtoseconds, or about 100 femtoseconds in duration. Each pulsed beam of the plurality of pulsed beams is of the same wavelength. In some embodiments, the plurality of optical sources 305 is about 300 optical sources or fewer.

In some embodiments, the optical sources of the plurality of optical sources 305 are arranged in a two-dimensional array. The array size will depend on the number of the optical sources. For example, the array may comprise a 3×3 array, a 4×4 array, a 5×5 array, or a 10×10 array. In some embodiments, the pulsed beams of the plurality of pulsed beams received by the first diffractive optical element 310 are arranged in a two-dimensional array. In some embodiments, the pulsed beams of the plurality of pulsed beams received by the first diffractive optical element 310 are arranged in a square, two-dimensional array. In the embodiment shown in FIG. 3, the optical sources of the plurality of optical sources 305 are arranged in a square, two-dimensional, 4×4 array. In the embodiment shown in FIG. 3, the pulsed beams of the plurality of pulsed beams received by the first diffractive optical element 310 are arranged in a square, two-dimensional, 4×4 array. The pulsed beams being arranging in a square two dimensional array allows for a maximum number of beams to be combined while minimizing the angle that each beam is diffracted. In some embodiments, beams of the plurality of beams are parallel or substantially parallel.

In some embodiments, the first diffractive optical element 310 comprises a grating array. In some embodiments, the grating array includes a plurality of individual gratings. In some embodiments, a number of the plurality of individual gratings is equal to a number of the plurality of pulsed beams. Each of the individual gratings diffracts each of the plurality of pulsed beams. A diffraction angle of each pulsed beam is such that all of the pulsed beam converge at a point a distance from the first diffractive optical element 310. In some embodiments, the distance is about 0.5 meters (m) to 1.5 m, or about 1 m, from the first diffractive optical element 310. In some embodiments, the diffraction angle of each pulsed beam is less than about 20 milliradians (mils), about 5 mils to 20 mils, or about 10 mils. For example, pulsed beams the furthest from a center of the first diffractive optical element 310 will be diffracted at a larger angle than pulsed beams closer the center of the first diffractive optical element 310. In some embodiments, the first diffractive optical element 310 induces a pulse front tilt in pulsed beams of the plurality of pulsed beams. The pulse front tilt induced in a pulsed beam may be of different magnitude and/or different direction than the pulse front tilt induced in other pulsed beams. In some embodiments, the first diffractive optical element 310 comprises a transmissive optical element.

Figure 4:
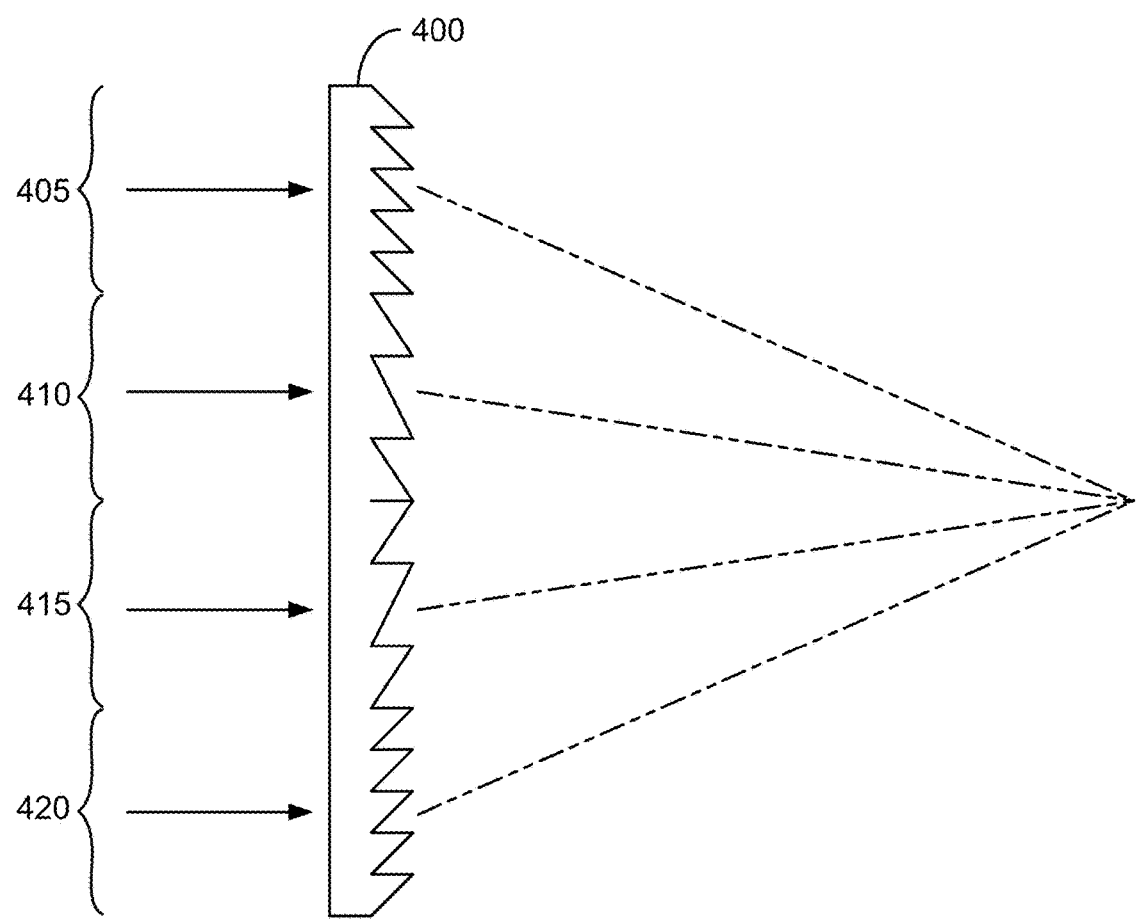
FIG. 4 shows an example of a cross-sectional schematic illustration of a grating array.

In some embodiments, the individual gratings comprise standard gratings. In some embodiments, the individual gratings comprise blazed gratings. A blazed grating is a type of diffraction grating that achieves a maximum efficiency in a specified direction. FIG. 4 shows an example of a cross-sectional schematic illustration of a grating array. Lines indicating the optical paths of pulsed beams when the pulsed beams are diffracted by the grating array are included in FIG. 4. The grating array 400 shown in FIG. 4 includes four individual blazed gratings, blazed grating 405, blazed grating 410, blazed grating 415, and blazed grating 420. The grating array 400 is a 4×1 grating array. The grating array 400 would be able to be used in the optical system 500 shown in FIG. 5, described below.

The blazed grating 405 and the blazed grating 410 both diffract pulsed beams downward. Comparing the blazed gratings 405 and 410, the blazed grating 405 is a shorter period grating and the blazed grating 410 is a longer period grating. The blazed grating 405 diffracts a pulsed beam at a larger angle than the blazed grating 410. The blazed grating 415 and the blazed grating 420 both diffract pulsed beams upward. Comparing the blazed gratings 415 and 420, the blazed grating 420 is a shorter period grating and the blazed grating 415 is a longer period grating. The blazed grating 420 diffracts a pulsed beam at a larger angle than the blazed grating 415. The blazed gratings 405 and 420 impart more pulse front tilt in pulsed beams than the blazed gratings 410 and 415.

Returning to FIG. 3, in some embodiments, the second diffractive optical element 315 is positioned at the point at which the diffracted pulsed beams converge. In some embodiments, the second diffractive optical 115 element comprises a beam splitter that operates as a beam combiner. In some embodiments, the beam splitter is oriented to combine the diffracted plurality of pulsed beams to generate the combined pulsed beam. When the beam splitter is oriented to combine the diffracted plurality of pulsed beams, the beam splitter is being operated in reverse; instead of splitting a beam into multiple beams, the beam splitter is combining multiple beams into a single beam. In some embodiments, the number of beams that the beam splitter splits the beam into is equal to the number of pulsed beams being combined. For example, if 16 pulsed beams are being combined, the beam splitter may comprise a 16-beam beam splitter (i.e., a beam splitter that splits a single beam into 16 beams). In some embodiments, the second diffractive optical element 315 comprises a transmissive element.

In some embodiments, the second diffractive optical element 315 removes the pulse front tilt in diffracted pulsed beams of the diffracted plurality of pulsed beams. In some embodiments, each pulsed beam of the plurality of pulsed beams is tilted by the first diffractive optical element 310, and the tilt of each pulsed beam is cancelled by the second diffractive optical element 315. The two diffractive optical elements 310 and 315 act as a diffraction grating pair, similar to those in a compressor, resulting in zero pulse front tilt, although with some temporal dispersion. If the diffraction angles are small (e.g., less than about 20 milliradians) at the first diffractive optical element and the second diffractive optical element, the temporal dispersion can be made small or negligible compared with the pulse length.

There may be uncompensated spatial chirp at the second diffractive optical element 315. This may decrease efficiency. The uncompensated spatial chirp can be reduced by using large pulsed beam diameters. In some embodiments, each pulsed beam of the plurality of pulsed beams has a diameter of about 1 millimeter (mm) to 20 mm. Further, the uncompensated spatial chirp in the output beam tends to be cancelled when there is a symmetric arrangement (e.g., a square array) of pulsed beams.

In some embodiments, the optical system 300 includes no further diffractive optical elements other than the first diffractive optical element 310 and the second diffractive optical element 315. That is, the optical system 300 includes only two diffractive optical elements, the first diffractive optical element 310 and the second diffractive optical element 315.

Note that the path lengths that some pulsed beams travel are different than the path lengths that other pulsed beams travel. As such, in some embodiments, the phase of each pulsed beam is controlled so that the pulsed beams are coherent at the point of convergence at the second diffractive optical element 315. Further, vibration in the optical system 300 can affect the phases of pulsed beams. Yet further, for fiber lasers, the fibers heat up and cool down during operation, which shifts the phase of pulsed beams from fiber lasers. The phase of pulsed beams from fiber laser can be controlled with a phase controller, for example. A phase controller can be implemented in various ways, including mechanical mirror movement, an actuator-controlled fiber stretcher, an electro-optic phase shifter, an acousto-optic frequency shifter, or a thermo-optic phase shifter, for example.

Figure 5:
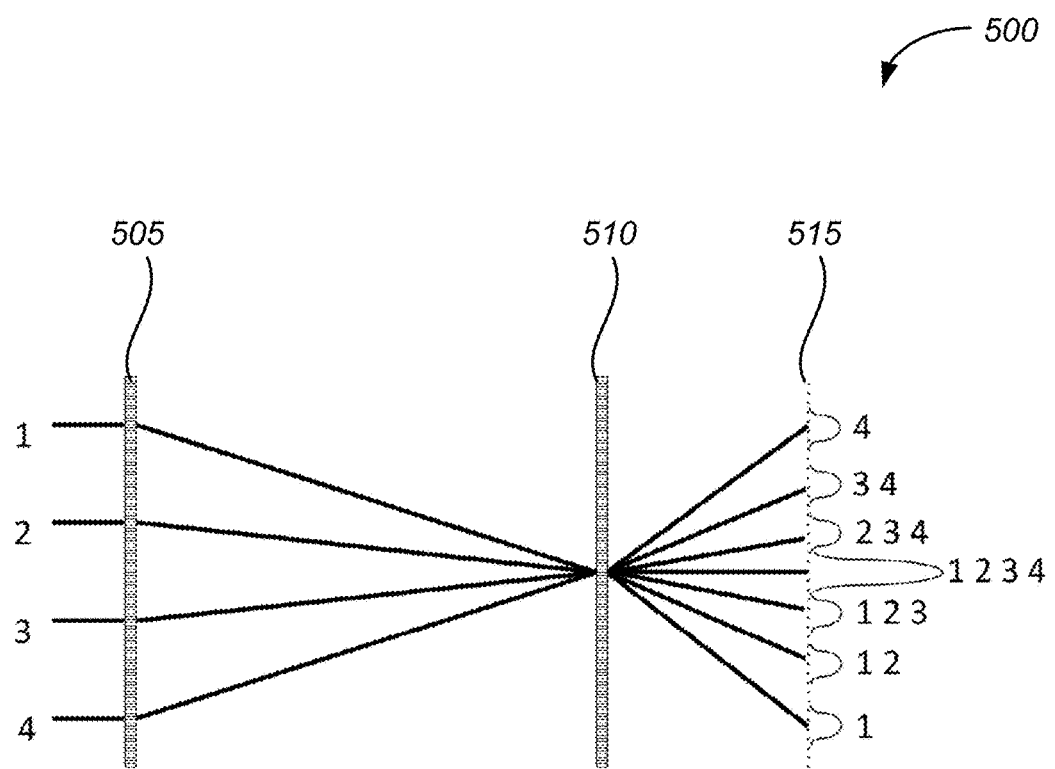
FIG. 5 shows an example of a cross-sectional schematic illustration of an optical system.

FIG. 5 shows an example of a cross-sectional schematic illustration of an optical system. The optical system 500 includes a grating array 505 and a 4× beam splitter 510. The paths of pulsed beams are also shown with the optical system 500. While the pulsed beams in the optical system 500 are shown as being in a line (i.e., a one dimensional 4×1 array), in some embodiments, the pulsed beams may be arranged in a 2×2 array.

After travelling through the 4× beam splitter 510, the resulting pulsed beams are shown at a detector plane 515. While the 4× beam splitter 510 is being operated in reverse (i.e., as a beam combiner), 4× beam splitter 510 is still a beam splitter. Thus, the 4× beam splitter 510 generates seven beams pulses, a central combined beam and six side beams.

The side beams are reduced or minimized when the pulsed beam combining of the optical system 500 is maximized or optimal.

Figure 6:
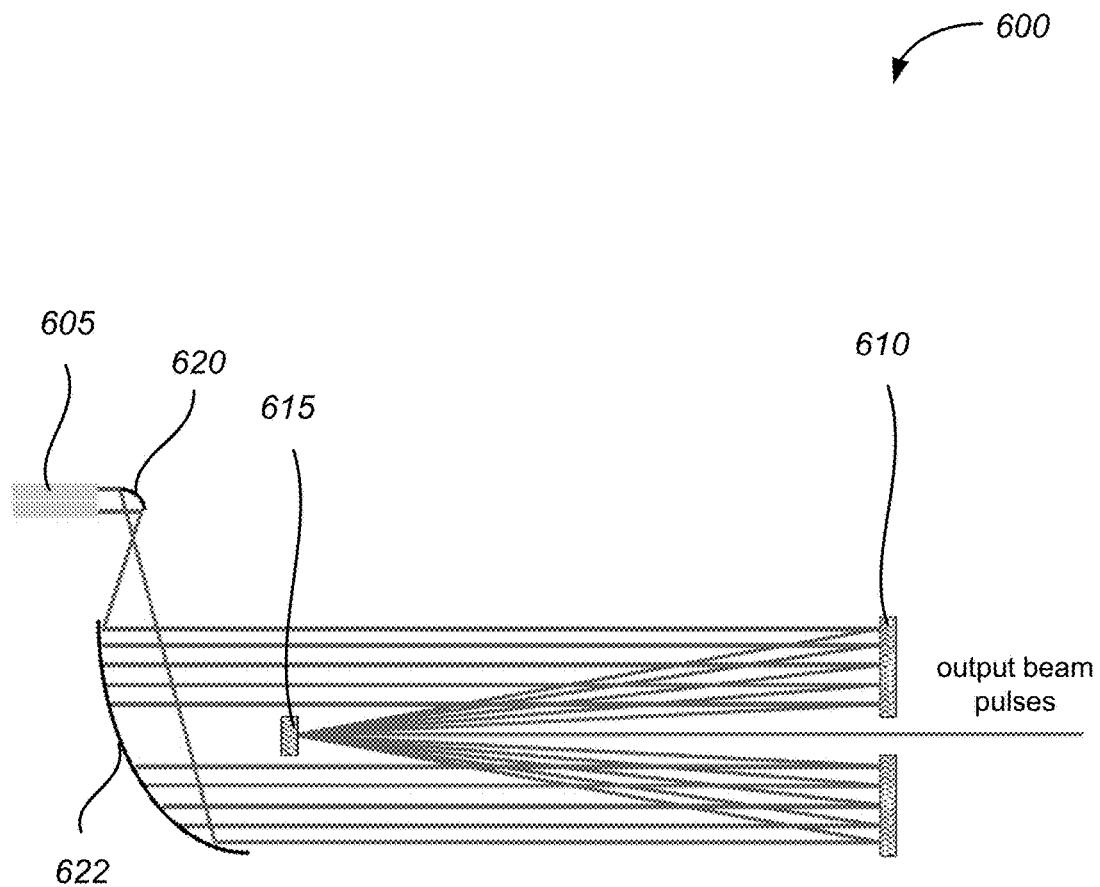
FIG. 6 shows an example of a cross-sectional schematic illustration of an optical system.

The optical systems 300 and 500 shown in FIGS. 3 and 5, respectively, include transmissive optical elements. A beam combiner optical system can also operate with reflective optical elements. FIG. 6 shows an example of a cross-sectional schematic illustration of an optical system. The optical system 600 shown in FIG. 6 includes reflective diffractive optical elements.

The optical system 600 includes a plurality of optical sources 605, a first diffractive optical element 610, and a second diffractive optical element 615. In some embodiments, the plurality of optical sources 605 comprises fiber lasers. In operation, each optical source of the plurality of optical 605 sources generates a pulsed beam that is less than about 1 picosecond (ps) in duration. In some embodiments, each pulsed beam of the plurality of pulsed beams has a wavelength of about 1 micron. The first diffractive optical element 610 receives and diffracts the plurality of pulsed beams. The second diffractive optical element 615 receives the diffracted plurality of pulsed beams and coherently combines the plurality of pulsed beams to generate a combined pulsed beam.

As the first diffractive optical element 610 is shown in cross-section, it is shown as two separate diffractive optical elements. In some embodiments, the first diffractive optical element 610 comprises a single piece of a material with a hole in the center of it to allow the combined pulsed beam to pass. In some embodiments, the first diffractive optical element 610 comprises a tiled array of diffractive elements that are securely held to maintain alignment, comprising any number of elements, with a central gap between them. In some embodiments, the first diffractive optical element 610 comprises a single piece of material with reflective elements implemented around a transparent section to allow the combined pulsed beam to pass. In some embodiments, the first and the second diffractive optical elements 610 and 615 are arranged such that the beams are deflected to one side to allow the combined pulsed beam to the side of the first diffractive optical element 610.

The optical system 600 also includes two concave mirrors, mirror 620 and mirror 622. Mirror 620 and mirror 622 serve to magnify the plurality of pulsed beams. That is, the diameter of the pulsed beams is increased by the mirror 620 and mirror 622. Magnifying the diameter of the pulsed beams also magnifies the spacing between the pulsed beams.

The magnification is performed with the optical system 600 because the beams initially come from a bundle of fibers arranged in an array. The output of this array is magnified so that it matches the diffractive optic array size, which is determined by the diffraction angles and beam sizes, which are in turn determined by the pulse parameters and the energy and power damage limits of the diffractive elements. Alternatively, in some embodiments, each fiber has a lens attached to it, which increases the beam size appropriately, and all the fibers with collimating lenses are arranged in an array which matches the first diffractive optic element array.

Figure 7:
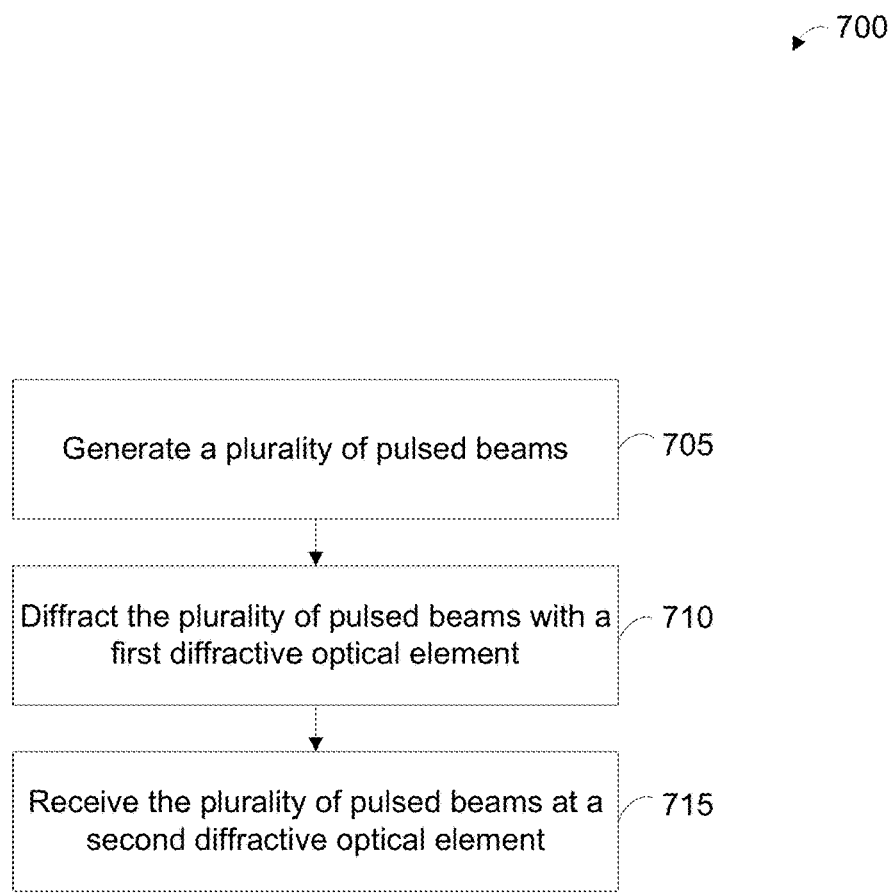
FIG. 7 shows an example of a flow diagram illustrating a process for combining pulsed beams.

FIG. 7 shows an example of a flow diagram illustrating a process for combining pulsed beams. The method 700 shown in FIG. 7 can be performed using the two diffractive optical element optical systems described herein. Starting at block 705, a plurality of pulsed beams is generated. Each pulsed beam is substantially parallel to other pulsed beams. Each pulsed beam is less than about 1 picosecond in duration. In some embodiments, pulsed beams of the plurality of pulsed beams are arranged in a two-dimensional array.

At block 710, the plurality of pulsed beams is diffracted with a first diffractive optical element so that the plurality of pulsed beams converge a distance from the first diffractive optical element. In some embodiments, the first diffractive optical element induces a pulse front tilt in pulsed beams of the plurality of pulsed beams.

At block 715, the plurality of pulsed beams is received at a second diffractive optical element. The plurality of pulsed beams is received at the distance from the first diffractive optical element. The second diffractive optical element combines the plurality of pulsed beams to generate a combined pulsed beam. In some embodiments, the second diffractive optical element removes the pulse front tilt in pulsed beams of the plurality of pulsed beams. In some embodiments, the method 700 does not use any further diffractive optical elements. That is, the first diffractive optical and the second diffractive optical are the only diffractive optical elements used in the method 700.

Embodiments of the optical system reduce the complexity of the combining optics, as well as decreasing the negative effect of a large number of optics on the compressed pulse. Diffractive elements are also capable of high average power and high efficiency, as demonstrated in the CW case. With fewer optics, the setup can be made more compact and stable, which is important for interferometric applications.

A goal of embodiments described herein is to enable laser-based accelerator facilities to perform experiments. Embodiments described herein can enable fiber lasers to produce high energy light pulses by combining a plurality of pulses (e.g., 10 pulses to 100 pulses) from a train after amplification.

There also could be applications to other types of lasers, and in other scientific or industrial uses. Currently, there is interest in short pulse micromachining using lasers, where the shorter the pulse the cleaner the cut or drilled hole. Some large industrial laser manufacturers are selling short pulse lasers for this purpose. Embodiments described herein would make a temporal pulse-combining addition more compact, cheap, and stable so that it could be added to existing laser technology without negatively impacting size or reliability.

The following examples are intended to be examples of the embodiments disclosed herein, and are not intended to be limiting.

EXAMPLE—THEORETICAL MODELING

The performance of the above-described pulse combiners was verified numerically using optical modeling software. In the model, a 100 fs, 1040 nm pulse was split into four, 2 mm diameter beams and sent into a set of four blazed, transmission diffraction gratings to deflect the beams at the specified angles. A 4-way splitter one meter from the transmission diffraction gratings combined the beams into one. The central beam was analyzed one meter from the 4-way splitter to yield pulse parameters, with the side beams included to calculate efficiency.

Figure 8:
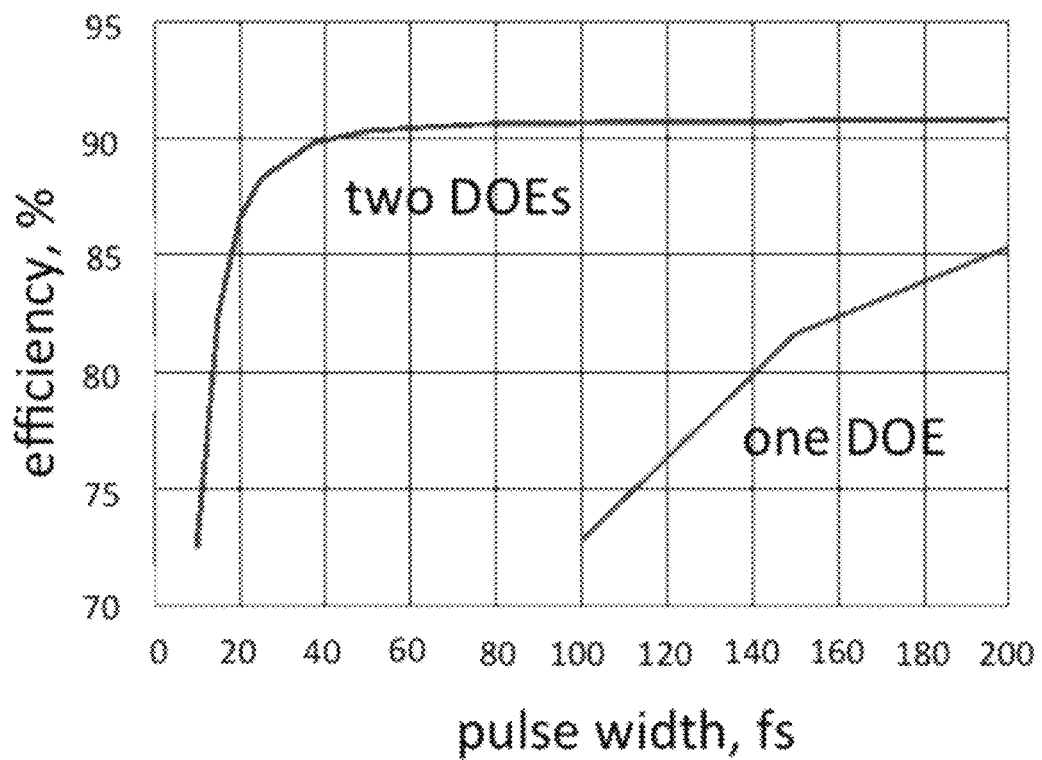
FIG. 8 shows calculations of combining efficiency versus pulse width for four-beam combination, based on a numerical model of optical field addition

Further simulations were used to compare the technique described herein with the single-DOE combination case, the results of which are shown in FIG. 8. FIG. 8 shows calculations of combining efficiency versus pulse width for four-beam combination, based on a numerical model of optical field addition. While the single DOE case suffers high loss at 100 fs due to pulse front tilt effect, the two-DOE scheme can support 30 fs pulses with a small amount of loss.

By adjusting parameters such as diffraction angle, beam size, and beam spacing, the temporal and spatial dispersion (i.e., uncorrected errors) introduced by this diffractive optic pair can be made negligible for the coherent combining process. An analytic theory of combining efficiency loss due to temporal and spatial dispersion for the combining of a 2-D array of (N*N−1) beams, where N is an odd number for symmetry and there is no central input beam, has been developed. The combining efficiency losses due to temporal dispersion and spatial dispersion are solved to be $$\Delta \eta_T \approx \frac{3 ln^2(2)}{4\pi^2}\left(\frac{\lambda_0 l^2}{c^2 \tau_p^2 L}\right)^2 \sigma_N^2;$$

$$\Delta \eta_S \approx \frac{\ln(2)}{3\pi^2}(N^2-1)\left(\frac{l\lambda_0}{D\tau_p c}\right)^2$$

where $\lambda_0$ is the central wavelength of the pulse spectrum, l is the beam separation on DOE1, c is the speed of light, $\tau_p$ is the FWHM of the temporal pulse intensity profile, L is the separation between DOE1 and DOE2, $\sigma^N_2$ is the variance of $(x^2+y^2)$ where x and y are integers within the range from −(N−1)/2 to +(N−1)/2, and D is the beam diameter. Gaussian spectrum and Gaussian beams are assumed, and the theory was developed in the perturbation limit, i.e., spatial and temporal dispersions are small with respect to beam size and pulse width, whose validity can be shown in practical cases by verifying that the calculated efficiency losses are numerically small. In an example case of 2-D combining of 224 beams, N=15, $\lambda_0$=1040 nm, l=10 mm, $\tau_p$=100 fs, L=5 m, and D=5 mm, $\Delta\eta_T \approx$1% and $\Delta\eta_s \approx$2.5%.

EXAMPLE—EXPERIMENTS

Figure 9:
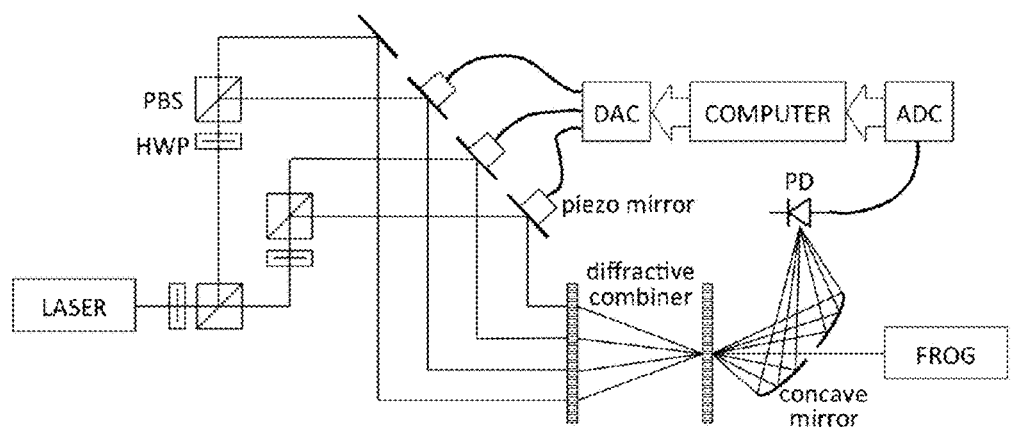
FIG. 9 shows an example of a schematic illustration of the experimental arrangement.

Diffractive optical elements having the same specifications as the elements used in the theoretical modeling were obtained. FIG. 9 shows an example of a schematic illustration of the experimental arrangement. A 100 fs, 1040 nm mode-locked fiber laser produced a pulse which was split into four beams by a wave plate/polarizer tree and delayed in metal-coated, hollow corner cubes. The four beams were directed by mirrors into the diffractive optic pair, followed by a CCD camera and a frequency resolved optical gaiting (FROG) diagnostic. A concave mirror with a central hole directed the un-combined beams to a photodiode, providing a signal which, when minimized, maximizes the combining efficiency. A computer implemented a stochastic parallel gradient descent (SPGD) algorithm to adjust beam phases using piezoelectric mirror actuators.

Figure 10:
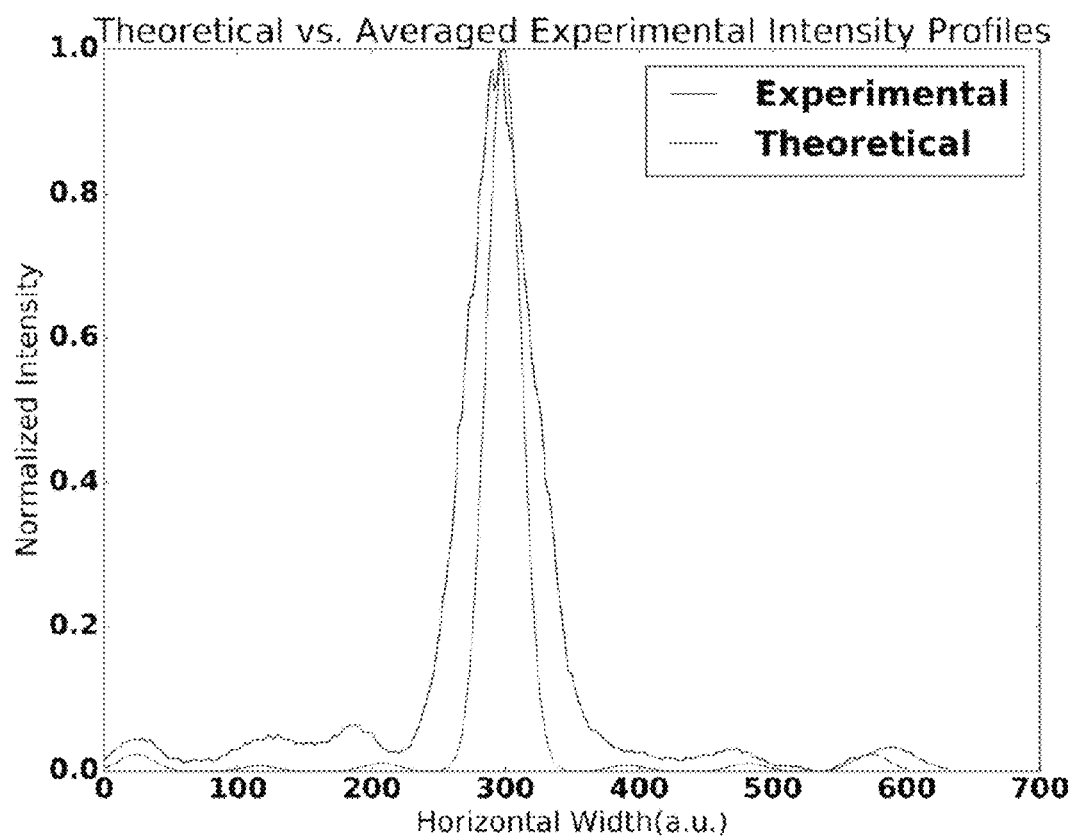
FIG. 10 shows the theoretical profiles and the experimental profiles of seven output beams.

FIG. 10 shows the theoretical profiles and the experimental profiles of seven output beams. The theoretical intensity pattern and the experimental intensity pattern observed on a CCD camera are shown in FIG. 10. In the theoretical modeling, for the central beam, the pulse front tilt was cancelled, and the spatial chirp was cancelled by the symmetrical arrangement of beams. The pulse duration and bandwidth were identical at input and output. The combining efficiency, defined here as the ratio between the central beam power and that of all seven beams, was 92%.

In the experiments, pulse width before and after the combiner pair was 108 fs and 111 fs respectively, while the bandwidths were 17.3 nm at input and output. Significant pulse front tilt at the input to the combiner pair was observed, likely a result of beams emerging from the polarizing beam-splitter cubes at non-normal angles, which varied from beam to beam. This variation cannot be simply compensated and may decrease the combining efficiency.

Figure 11:
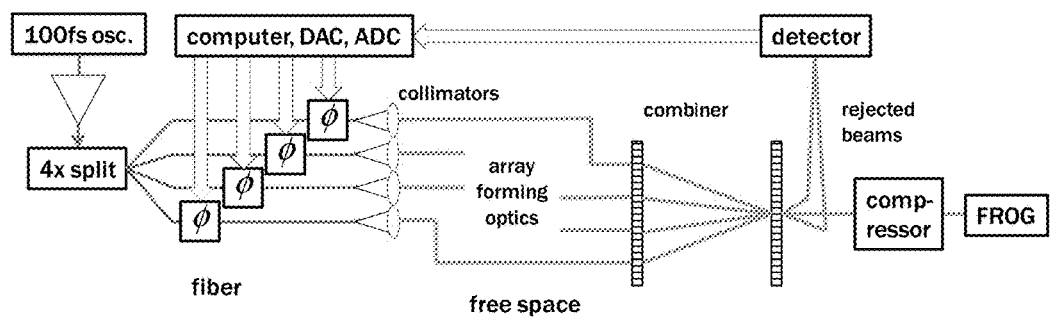
FIG. 11 shows an example of a schematic illustration of another experimental arrangement.

FIG. 11 shows an example of a schematic illustration of another experimental arrangement. 120 fs transform-limited pulses centered at 1040 nm with a repetition rate of 100 MHz from a mode-locked oscillator were amplified up to 150 mW average power using a Yb fiber amplifier, then split into four fiber channels with phase controllers, and collimated out forming four parallel equal-power beams onto DOE1, with a beam diameter of 2 mm and a beam separation of 5 mm. The fiber system was all polarization maintaining, and the path lengths of all channels can be matched by mounting the fiber collimators on translation stages. The first DOE is an array of blazed diffraction gratings which directs all the beams to one spot on the second DOE 1 m away from the first DOE, which is a 1-to-4 beam splitter operated in reverse, so that the input beams are combined into one, when properly phased. The central combined beam is launched into a double pass grating pair compressor, and the compressed pulses are sent to FROG diagnose. Compressor gratings have a groove density of 300 lines/mm and their separation is set to ~70 cm for optimal pulse compression. A concave mirror with a central hole directs the side beams to a photodiode, providing the computer a signal which, when minimized, maximizes the central combined beam. The computer controls the phase of each beam using fiber phase shifters, so that the side beam power is minimized using a stochastic parallel gradient descent (SPGD) algorithm.

Figure 12:
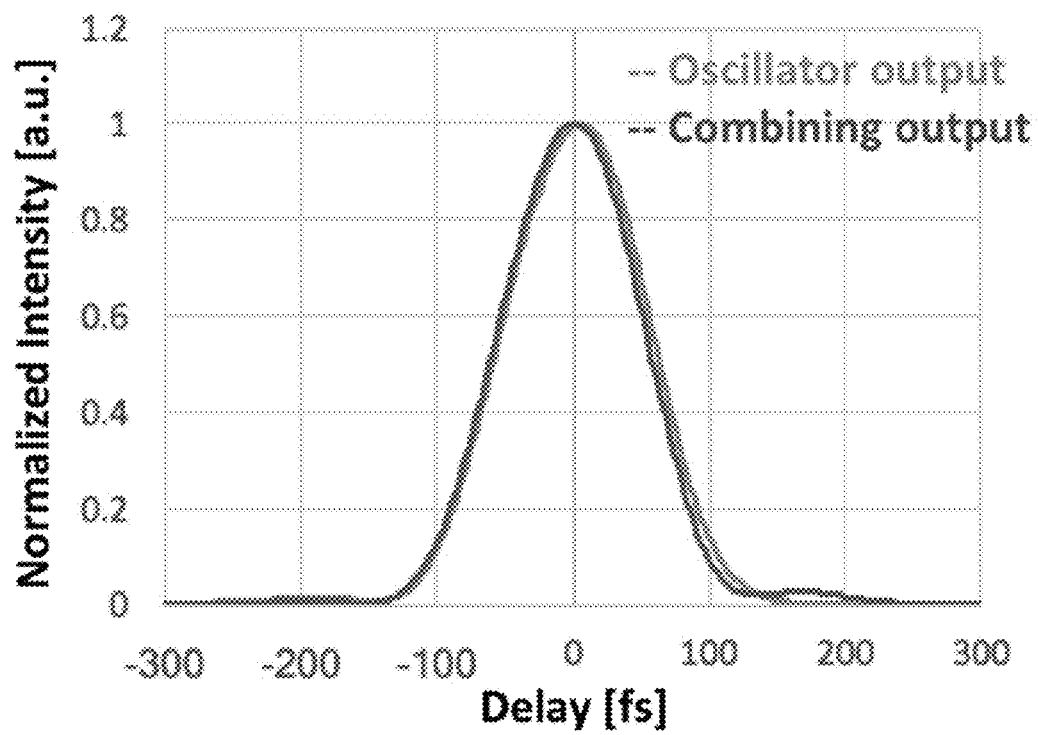
FIG. 12 shows that the combined and compressed pulses preserve the 120 fs transform limited pulse width of the oscillator output pulses.

After the phases of the four fiber channels are controlled for optimal coherent combining, the combined and compressed pulses preserve the 120 fs transform limited pulse width of the oscillator output pulses, as shown in FIG. 12. Here the relative combining efficiency is defined as the ratio of the power of the central combined beam with respect to the total power of the combiner output. A relative combining efficiency of 85% was measured, but clipping of the combined beam on the central hole of the concave mirror could not be avoided, so the real efficiency would be higher. A simulation yielded a 92% relative combining efficiency. Here the efficiency is limited largely due to imperfect DOE such as non-uniform splitting ratios. The absolute combining efficiency is lower because in this proof-of-principle experiment, uncoated diffractive optics were used.

CONCLUSION

Further details regarding the embodiments described herein can be found in R. Wilcox et al., "Femtosecond Beam Combination Using Diffractive Optic Pairs," in *Conference on Lasers and Electro-Optics*, OSA Technical Digest (on-line) (Optical Society of America, 2017), paper SM41.2, which is herein incorporated by reference.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

What is claimed is:

1. An optical system comprising:
    a plurality of optical sources, the plurality of optical sources operable to generate a plurality of beam pulses that is less than about 1 picosecond in duration, each beam pulse of the plurality of beam pulses having the same central wavelength;
    a first diffractive optical element, the first diffractive optical element operable to receive and to diffract the plurality of beam pulses; and
    a second diffractive optical element, the second diffractive optical element operable to receive the diffracted plurality of beam pulses with no lenses being positioned between the first diffractive optical element and the second diffractive optical element, the second diffractive optical element operable to generate a combined beam pulse from the diffracted plurality of beam pulses.

2. The optical system of claim 1, wherein the plurality of optical sources comprises fiber lasers.

3. The optical system of claim 1, wherein the plurality of beam pulses is about 10 femtoseconds to 500 femtoseconds in duration.

4. The optical system of claim 1, wherein beam pulses of the plurality of beam pulses received by the first diffractive optical element are arranged in a two-dimensional array.

5. The optical system of claim 1, wherein the first diffractive optical element comprises a grating array, wherein the grating array includes a plurality of individual gratings, and wherein a number of the plurality of individual gratings is equal to a number of the plurality of beam pulses.

6. The optical system of claim 5, wherein the individual gratings comprise blazed gratings.

7. The optical system of claim 1, wherein the first diffractive optical element induces a pulse front tilt in beam pulses of the plurality of beam pulses.

8. The optical system of claim 1, wherein the second diffractive optical element comprises a beam splitter.

9. The optical system of claim 8, wherein the beam splitter is oriented to combine the diffracted plurality of beam pulses to generate the combined beam pulse.

10. The optical system of claim 1, wherein the second diffractive optical element removes the pulse front tilt in diffracted beam pulses of the diffracted plurality of beams.

11. The optical system of claim 1, wherein the optical system includes no further diffractive optical elements other than the first diffractive optical element and the second diffractive optical element.

12. The optical system of claim 1, wherein the first diffractive optical element and the second diffractive optical element comprise transmissive optical elements.

13. The optical system of claim 1, wherein the first diffractive optical element and the second diffractive optical element comprise reflective optical elements.

14. A method comprising:
    (a) generating a plurality of beam pulses, each beam pulse being substantially parallel to other beam pulses, each beam pulse being less than about 1 picosecond in duration and having the same central wavelength;
    (b) diffracting the plurality of beam pulses with a first diffractive optical element so that the plurality of beam pulses converge a distance from the first diffractive optical element;
    (c) receiving the plurality of beam pulses at the distance from the first diffractive optical element at a second diffractive optical element with no lenses being positioned between the first diffractive optical element and the second diffractive optical element, the second diffractive optical element combining the plurality of beam pulses to generate a combined beam pulse.

15. The method of claim 14, wherein beam pules of the plurality of beam pulses are arranged in a two-dimensional array in operation (a).

16. The method of claim 14, wherein the first diffractive optical element induces a pulse front tilt in beam pulses of the plurality of beam pulses.

17. The optical system of claim 14, wherein the second diffractive optical element removes the pulse front tilt in beam pulses of the plurality of beam pulses.

18. The method of claim 14, wherein the method does not use any further diffractive optical elements.

19. The optical system of claim 1, wherein a diffraction angle of each beam pulse of the plurality of beam pulses is less than about 20 milliradians.

20. The optical system of claim 1, wherein each beam pulse of the plurality of beam pulses has a diameter of about 1 millimeter to 20 millimeters.

* * * * *